United States Patent [19]
Kaneko et al.

[11] 3,963,547
[45] June 15, 1976

[54] METHOD OF MANUFACTURING COMPOSITE HEAT-INSULATING MATERIAL

[75] Inventors: Yasuhisa Kaneko; Fumiyoshi Noda, both of Toyota, Japan

[73] Assignee: Toyota Jidosha Kogyo Kabushiki Kaisha, Toyota, Japan

[22] Filed: Apr. 2, 1974

[21] Appl. No.: 457,363

[30] Foreign Application Priority Data
Apr. 11, 1973 Japan.................. 48-41075

[52] U.S. Cl................... 156/79; 106/38.3; 106/40 R; 106/86; 138/149; 138/DIG. 9; 165/136; 181/33 R; 264/46.5; 264/46.9; 428/313
[51] Int. Cl.²............................................ B32B 5/18

[58] Field of Search.............. 156/79; 252/62; 138/149, DIG. 9; 264/42, 45; 106/38.3, 40 R, 84, 86; 428/312, 313

[56] References Cited
UNITED STATES PATENTS
3,728,187  4/1973  Martin .................. 138/149
3,814,659  6/1974  Nadeau .................. 428/313

*Primary Examiner*—Edward G. Whitby
*Attorney, Agent, or Firm*—Brisebois & Kruger

[57] ABSTRACT

Method of manufacturing composite heat-insulating material, by stacking to a desired thickness pieces of aluminum foil adhesively secured to foam-forming ceramic material, filling the volume to be occupied by said heat-insulating layer or a vessel with the resulting stack, and heating it to cause foaming of said ceramic material.

6 Claims, 1 Drawing Figure

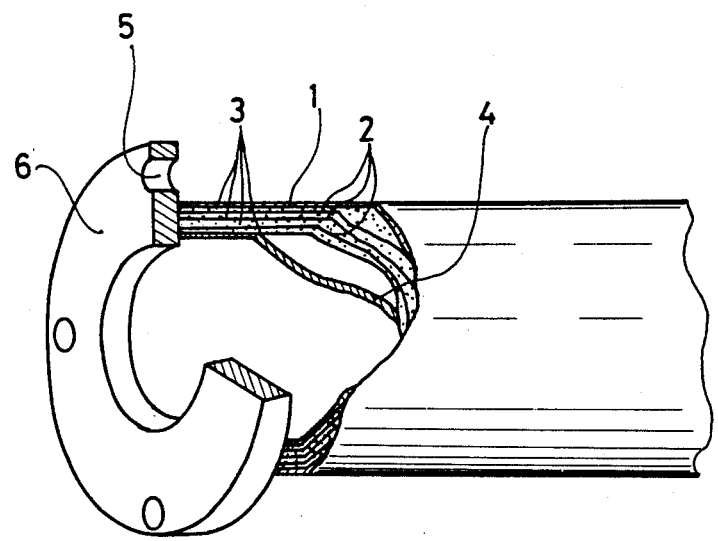

METHOD OF MANUFACTURING COMPOSITE HEAT-INSULATING MATERIAL

BACKGROUND OF THE INVENTION

It has been a popular practice to wrap a pipe with glass fiber or asbestos to preserve the heat of steam or gas flowing therethrough. Such a practice, however, has the drawback that where the pipe is exposed to water or vibration, the effect of the heat insulation drops or the heat-insulating material is pulverized. For this reason, in some cases, the pipe wrapped with such heat-insulating material is further encircled by another pipe. In such cases, however, with a gap left between the wrapped heat-insulating material and the sheathing pipe, it is unavoidable that the heat-insulating material becomes pulverized when the pipe is exposed to vibration. In order to compensate for these drawbacks, a heat-preserving pipe has been devised which represents a pipe in which the heat-insulating space is filled with foaming synthetic resin, which is later caused to foam, but it lacks heat resistance and is restricted in its applicability.

SUMMARY OF THE INVENTION

The present invention provides a process of manufacturing a heat-insulating material free from the risk of being pulverized or losing its effect under vibration, and which can be easily foamed to fill the heat-insulating layer to be formed.

BRIEF DESCRIPTION OF THE DRAWING

The attached drawing is a partially cutaway oblique view of a heat-insulated pipe using the heat-insulating material of the present invention.

DETAILED DESCRIPTION OF THE INVENTION

The present invention aims at the manufacture of a composite heat-insulating material by bonding a ceramic material which foams when heated, to one or both sides of a piece of aluminum foil, filling a vessel or a predetermined volume to form a heat-insulating layer with layers of such pieces and then heating them to cause foaming.

Such a composite heat-insulating material, which represents layers of aluminum foil sandwiched at definite intervals between layers of a foaming ceramic material, does not pulverize as easily under vibration as does a conventional material composed of foaming ceramic material alone. At the same time, since the sandwiched aluminum foils mutually radiate the heat, a far greater heat-insulating effect is achieved than in the case of single foaming ceramic material.

For the present invention, any aluminum foil, hard or soft, is suitable, with no particular restriction on its thickness, but from the standpoint of workability, a soft one with thickness of $10-20\mu$ is recommended.

Foaming ceramic materials to be bonded to the aluminum foil may be of any type, so long as they are foamable and heat-insulating. Specifically, suitable materials include water glass, and water glass mixed with aluminum hydroxide, magnesium hydroxide or alumina. It may be applied in liquid form or in the form of a foamable powder which is to be spread on the aluminum foil by using an appropriate bonding agent.

According to the present invention, aluminum foil bonded with the above-mentioned foaming ceramic material is wrapped to a specified thickness annularly or concentrically, for instance, between the inner pipe and the outer one for heat preservation, and then simply heated with both ends closed, thereby manufacturing a highly heat-insulating pipe system.

In this invention it goes without saying that for the purpose of foaming, it is not always necessary to fully seal up the vessel or both ends of the pipe holding the above-mentioned aluminum foil; the sealing is sufficient if it prevents leakage of foaming ceramic material. In the following description several examples of specific methods executing the present invention will be described.

EXAMPLE 1

The drawing shows a partially cutaway oblique view of a heat-insulated pipe according to the present invention, wherein reference numeral 1 indicates the outer pipe, 2 the aluminum foil, 3 the foaming ceramic material, 4 the inner pipe, 5 a bolt hole in the flange for fitting the heat-insulated pipe, and 6 the flange itself.

To manufacture a heat-insulated pipe according to the present invention, the inner pipe 4 is first sprayed with liquid water glass (JIS-3) and an aluminum foil also coated with water glass is applied thereto. After successive wrappings of such water glass-coated aluminum foils; said inner pipe 4 is inserted into the outer pipe 1; the flange is welded thereto; and the resulting double-walled pipe is heated in a furnace at 250°C to cause the water glass to foam, thereby producing a heat-preserving pipe.

The water glass (JIS-3) to be used in the present example consists essentially of $SiO_2$, 28–30%; $Na_2O$, 9–10%, Fe less than 0.02%, indissolubles 0.2% and the balance water.

The heat-insulated pipe thus produced consists of an inner iron pipe (outer diameter 40 mm) and an outer iron pipe (inner diameter 56 mm) the heat-insulating layer being 8 mm thick with five $20\mu$ aluminum foils interleaved therein. When a gas at a temperature 450°C was passed through the inner pipe, the outer pipe registered a surface temperature of 115°C; when the foamed body consisted of water glass alone with no insertion of aluminum foil, the surface temperature of the outer pipe attained 190°C.

EXAMPLE 2

Instead of the water glass employed in Example 1, a mixture of liquid water glass (JIS-3) with 35% of aluminum hydroxide was used and the same process as in Example 1 was carried out to manufacture a heat-insulated pipe.

When an exhaust gas at a temperature of 450°C was passed through the inner pipe, the outer pipe registered a surface temperature of 105°C.

By contrast, when an exhaust gas at 450°C was passed through an inner pipe heat-insulated with a foamed layer alone, having no sandwiching of aluminum foil, the outer pipe registered a surface temperature of 185°C.

EXAMPLE 3

A mixture of liquid water glass (JIS-3) with 20% of aluminum hydroxide was atomized to dry it, thereby yielding a water glass powder (having an average particle size less than 0.5 mm, and a water content of 21%).

This powder was spread to a thickness of 1 - 2 mm on a $20\mu$ thick aluminum foil, upon which colloidal silica was sprayed and dried at 100°C for 1 hour, thereby bonding the powder to the aluminum foil.

Layers of such powdered-bonded aluminum foil were built up to a total thickness of 70 mm from the bottom of an iron-plate vessel with an internal volume measuring 50 cm long, 50 cm wide and 10 cm high. The vessel was sealed with an iron plate and heated to 500°C to cause said water glass powder to foam. When taken out of the vessel after foaming, a heat-insulated structure of a specified thickness was produced.

EXAMPLE 4

A powder having a water content of 25% and less than 1 mm in particle size was obtained by adding 20% of aluminum hydroxide powder to liquid water glass (JIS-3) and atomizing this mixture to dry it. This powder was spread to a thickness of 1 – 3 mm on a 20μ thick aluminum foil, upon which colloidal silica (see Table 1) was sprayed and dried at 100°C for 1 hour, thereby producing a powder-bonded aluminum foil. This aluminum foil was wrapped to a thickness of 5 – 6 mm around the inner pipe 4 (outer diameter 40 mm) of an exhaust pipe; inserted into an outer pipe (inner diameter 56 mm); and with a flange spot-welded thereto, the resulting assembly was heated to 400°C, thereby producing a double-walled pipe as shown.

This pipe was attached to an automobile for measurement of its effectiveness as heat insulation, the results being summarized in Table 2.

Table 2 shows the relationship between the number of aluminum foils and the surface temperature when the temperature of the gas passing through the inner pipe was set at 450°C.

Table 2 shows how the effect of heat insulation improves with an increase in the number of aluminum foils.

Table 1

| Items | Characteristic values |
|---|---|
| Silicic anhydride ($SiO_2$) | 20 – 21% |
| Sodium oxide ($Na_2O$) | less than 0.02% |
| Hydrogen-ion concentration (pH) | 8 – 9.5 |
| Particle size | 10 – 25 mμ |
| Viscosity (centipoise) | less than 3 c.p. |
| Specific gravity (20°C) | 1.12 |

Table 2

| Number of aluminum foils | Surface temperature (°C) |
|---|---|
| 1 | 163 |
| 2 | 132 |
| 3 | 125 |
| 4 | 116 |
| 5 | 107 |

This exhaust pipe was attached to an automobile for a 10,000 Km running test, after which said pipe was cut for inspection, but no deterioration was found. In the service test, the pipe was exposed to impact over stepped stones as well as to vibrations of 10–25 G.

What is claimed is:

1. A method of manufacturing a composite heat insulating material comprising the steps of
    forming on aluminum foil a coating of an unexpanded foamable ceramic material selected from the group consisting of water glass and water glass mixed with aluminum hydroxide, magnesium hydroxide, or alumina while causing said unexpanded material to adhere to said foil,
    introducing a plurality of layers of said coated foil into an enclosed space between an inner member and an outer jacket encircling said inner member with said layers parallel to the wall of said jacket, and
    then heating said layers to cause foaming of said ceramic material to form an expanded heat insulating body filling said space.

2. Method as claimed in claim 1, wherein said foaming ceramic material is in liquid or powder form and bonded to said metallic foil with a bonding agent.

3. Method as claimed in claim 1 in which said space is defined between the walls of a double-walled pipe suitable for use as the exhaust pipe of an automobile.

4. A method according to claim 1 wherein said step of forming a coating on the foil with the ceramic material comprises bonding the unexpanded ceramic material to the foil.

5. A method according to claim 1 wherein said step of introducing a plurality of said layers into an enclosed space comprises the step of introducing said layers between the walls of a double-walled pipe to produce a heat insulating pipe with a durable heat insulating body between the walls of the pipe.

6. A method according to claim 1 wherein said step of forming a coating on aluminum foil comprises applying a thin fluid coating of a ceramic material which inherently adheres to the foil; and said step of introducing said layers comprises building up a stack with alternate layers of ceramic material and foil and introducing said stack into said space.

* * * * *